United States Patent Office 2,956,019
Patented Oct. 11, 1960

2,956,019
CABLE PULLING LUBRICANT COMPRISING A CLAY-ORGANIC COMPLEX

Leonard B. Sand, Park Forest, James F. Wygant, Rich Township, Cook County, and Philip T. Mecozzi, Chicago Heights, Ill., assignors to Standard Oil Company, Chicago, Ill., a corporation of Indiana No Drawing. Filed Mar. 1, 1954, Ser. No. 413,468

8 Claims. (Cl. 252—21)

This invention relates to a lubricant for use in pulling cables through metal conduits.

It is difficult to pull electrical cables, whether covered with rubber, fabric, or lead, and ordinary lubricants available are not satisfactory. The lubricant should neither deteriorate the insulation, cake and cement on drying, or cause short circuits on rubber or fabric-covered cables, but should have the necessary property of good adherence to the cable. Heretofore, the petroleum-based greases, linseed oil and mica mixtures, and the like have been proposed, but are unsatisfactory. The oil-base greases deteriorated the rubber insulation. The linseed oil and mica mixture cake and cement the cable to the conduit which makes a later withdrawal of the cable very difficult. Other cable pulling compounds do not adhere sufficiently to the cable and the lubricant is lost by being scraped from the cable when passing around a bend.

It is, therefore, a primary object of this invention to provide a composition which facilitates the pulling of cables through metal conduits while avoiding the above enumerated deficiencits of existing materials. A more specific object of the invention is to provide a cable pulling compound which does not adversely affect the insulation; does not cake and cement on drying; does not cause short circuits on rubber or fabric-covered cables; and does adhere to the cable. These and additional objects of the invention will become apparent as the description thereof proceeds.

Briefly, the composition in accordance with our invention comprises plate-like mineral fillers, glycerine and a detergent. The plate-like mineral fillers are of restricted particle size ranges. A filler of a type capable of forming a complex with glycerine is preferred and an example thereof is a sodium bentonite of the Wyoming type. The filler is mixed with a specified amount of glycerine to form an organic-clay complex having the proper consistency. To increase the adherence properties of the lubricant complex, we add a filler which is preferably talc or talc-like material having a layer lattice structure and containing no mater of hydration. This filler is a platy mineral compound not capable of forming a complex with glycerine and is of a preferred particle size. A selected detergent of the stable foam-forming and deflocculating type is included to improve the consistency of the complex thereby making it easier to apply the complex to the cable and adding to its lubricating properties.

A lubricant according to our invention for facilitating the pulling of electrical cables through metal conduits may comprise between about 60 and 65 weight percent of glycerine, between about 25 and 30 weight percent of a layered clay mineral in which the adsorbed interlayer water can be reversibly replaced by glycerine, between about 5 and 10 weight percent of a layered or platy mineral having no interlayer water, and between about 1.5 and 2.5 weight percent of clay-deflocculating and foam-forming anionic detergent.

A preferred formulation is as follows:

| | | |
|---|---|---|
| Sodium bentonite (60 percent of particles smaller than 0.5 microns) | 26 lbs. and 6 ozs | 26.4 wt. percent. |
| Glycerine | 6.25 gals | 62.4 wt. percent. |
| Talc (Air-floated to pass 200 mesh) | 9 lbs. and 4 ozs | 9.2 wt. percent. |
| Detergent (Foam-forming alkyl aryl sulfonate and sodium sulfate extender) | 2 lbs | 2.0 wt. percent. |

This formulation is compounded by (1) thoroughly mixing the glycerine and sodium bentonite to form an organic-clay complex; (2) thoroughly mixing in the talc; and (3) thoroughly mixing in the detergent. The speed of mixing is important, a minimum speed of about 300 r.p.m. being necessary and speeds of about 300 to 500 r.p.m. being preferred. Mixing is best accomplished in a high speed mechanical mixer of which the planetary vertical type (sometimes called a dough mixer) is the preferred type. Slow speeds are desirable during the addition and homogenization of the components. High speeds are preferred during the final part of the mixing operation, after all ingredients have been added, in order to form the foam which contributes to the easy handling properties of the lubricant. The lubricant preferably is foamed to a density of seven to eight pounds per gallon or about 25 to 35% by volume of stable foam. The desired spongy consistency thus obtained corresponds to a cone penetration of approximately 250 (unworked, 30 g. cone) at about 75° F. as measured by ASTM Designation D217–52T.

The talc or talc-like filler added for improving the adherence properties of the lubricant may vary from about 5% to about 10% by weight with 9% to 10% preferred. Fillers in excess of about 10% by weight cause objectionably high fluidity and reduce the adherence, whereas less than about 5% results in a marked decrese in adherence.

Other non-complex-forming platy materials which may be utilized in our composition to improve the adherence properties include muscovite mica, pyrophyllite, or kaolin in proportions and having particle size ranges similar to that described with respect to talc.

The detergent is preferably of the foam-forming, anionic type comprising blends of synthetic organics with inorganic salts. The proportion of the detergent may vary up to about 2.5% with about 2.0% preferred. Larger percentages of detergent result in too light a consistency and decreased adherence to the cables. Compositions containing less than about 1.5% detergent have satisfactory lubricating properties but are dense and difficult to handle and to apply to the cables.

Inclusion of a selected detergent imparts a foamed, spongy consistency which is easily handled without dripping and is easily applied in a uniform coating to cables, increases lubricating properties by deflocculating the clay, and because of these improvements in properties and the low density of the foamed composition permits economy of use on a weight basis.

The proportions of glycerine and sodium bentonite comprising the remainder of the composition are varied slightly according to the percent of talc or other filler. Sodium bentonite requires about 20% more glycerine than does a corresponding weight of the fillers if the preferred consistency is to be obtained. This is apparently due to the consumption of some glycerine in formation of the glycerine-bentonite complex. However, such complex does not form with the talc-like materials having a layer-lattice structure and containing no water of hydration.

The resultant composition is a somewhat slick paste having excellent lubricating properties, excellent adherence to fabric, rubber and lead, and no tendency to cause short circuits.

In pulling cables through metal conduits, the National Electric Code (1953), paragraph 3471, article 346, recommends that the equivalent of no more than four 90° elbows be included in each pull. Along a 300 foot conduit there are ordinarily two pull points spaced about 100 feet apart through which the cables are pulled and then fed again into the conduit for the next pull point. This recommendation is apparently dictated by the fact that conventional lubricants heretofore available would not adhere to the cable and were removed in passing over the elbows. However, it has been found in actual large scale operations that on runs normally requiring three separate pulls of the cable, the pulls using our compound were accomplished in one continuous operation. Large savings in time and expense can, therefore, be obtained by the use of our described composition.

From the above, it will be apparent that we have provided a composition which is very useful for pulling cables through conduits. The complex-forming platy mineral is preferably sodium montmorillonite, such as Wyoming bentonite, and preferably with a particle distribution such that at least 60% of the particles are smaller than 0.5 micron in equivalent spherical diameter. Non-swelling bentonites, such as naturally occurring calcium bentonite and other montmorillonite-type minerals such as attapulgite, hectorite, etc. are not useful as the complex-forming mineral in our composition.

Glycerine is a preferred complex-forming material. Dilution with water, or with another polar organic liquid capable of entering the interlayer structure (such as ethylene glycol), to the extent of about 10% to about 15% by weight of the glycerine does not impair the desirable properties of the composition. Larger percentages of water diminish the desirable properties of adherence to the cable; and larger percentages of another polar organic liquid, such as ethylene glycol, diminish the desirable properties of stability, density and consistency.

The talc is also fixed divided and preferably passes a 200 mesh sieve. This material does not form a complex with the glycerine, but serves to give good adherence to the composition. In general, detergents of the foam-forming, anionic type comprising blends of synthetic organics with inorganic salts, such as "Tide," "Dreft" and "Alconox" can be used. We prefer to use "Alconox" which contains, by our analysis, about 10% of a synthetic organic, alkyl aryl sulfonate, blended with about 25% of sodium tripolyphosphate, 5% of sodium sulfate, 40% of sodium carbonate and 20% moisture.

In "Alconox" the alkyl aryl sulfonate may be either n-dodecyl or ceryl benzene sulfonate, in "Tide" the alkyl aryl sulfonate is typically branched-chain propylene-tetramer benzene sulfonate, whereas "Dreft" is lauryl or n-dodecyl sulfate.

The resulting composition is of light weight, is sufficiently cohesive to facilitate handling but has unusual adhesion properties permitting the pulling of long lengths of cable without stripping the lubricant complex from the cable. The composition dries to a fragile powder and thereby avoids caking or cementing of the complex in place. Further, the composition does not lose its desirable properties at temperatures below freezing which is a deficiency of some prior materials proposed for this service.

Although we have described our invention with reference to a specific embodiment thereof, it should be understood that this is by way of illustration only and that one skilled in the art can alter the composition and the technique of preparing the composition without departing from the scope of the described invention. For example, the compounding may be effected in other than a stirred mixing chamber. We may, for example, employ a colloid mill.

What we claim is:

1. A lubricant composition for facilitating the pulling of electrical cables through metal conduits consisting essentially of between about 60 and 65 weight percent of glycerine, between about 25 and 30 weight percent of a swelling sodium bentonite, between about 5 and 10 weight percent of a layered mineral filler of a particle size to pass through a 200 mesh screen and having no interlayer water selected from the group consisting of talc, mica, pyrophyllite and kaolin, and between about 1.5 and 2.5 weight percent of a clay-deflocculating and a foam-forming detergent comprising a compound selected from the class consisting of an alkyl aryl sulfonate and an alkyl sulfate.

2. The lubricant composition of claim 1 wherein the sodium bentonite has a particle size such that about 60% is smaller than about 0.5 micron and the layered mineral is talc of corresponding particle size.

3. The lubricant composition of claim 1 wherein said glycerin contains not in excess of 15 weight percent of water.

4. A composition of matter adapted for use as a lubricant to facilitate the pulling of covered electrical cables through metal conduits consisting essentially of a homogeneous complex of sodium bentonite and glycerine, the said glycerine comprising between about 60 and 65 weight percent and the said bentonite between about 25 and 30 weight percent of the composition, between about 5 and 10 weight percent of talc of a particle size to pass through a 200 mesh screen blended with said complex, and between about 1.5 and 2.5 weight percent of a detergent to produce and stabilize a foamed consistency of the lubricant composition, said detergent comprising a compound selected from the class consisting of an alkyl aryl sulfonate and an alkyl sulfate.

5. The method of preparing a lubricant composition which does not cause deterioration of cable covers, does not form short circuits, but has strong adherence to the cable, comprising the steps of blending between about 25 and 30 weight percent of sodium bentonite and between about 60 and 65 weight percent of glycerine to form a plastic complex, admixing with said complex between about 5 and 10 weight percent of talc of a particle size to pass through a 200 mesh screen to increase the adherence of the composition, and finally admixing with said ingredients between about 1.5 and 2.5 weight percent of a foam-forming detergent to obtain and stabilize the proper foamed consistency of blended ingredients and to facilitate its application to the cable coverings, said detergent comprising a compound selected from the class consisting of an alkyl aryl sulfonate and an alkyl sulfate.

6. A composition of matter adapted for use as a lubricant to facilitate the pulling of covered electrical cables through metal conduits consisting essentially of a homogeneous blend of sodium bentonite and glycerine in the form of a complex, said complex comprising between about 25 and 30 weight percent of said bentonite and between about 60 and 65 weight perecnt of said glycerine, between about 5% and about 10% by weight of talc of a particle size to pass through a 200 mesh screen, and between about 1.5 weight percent and about 2.5 weight percent of an anionic foam-forming detergent containing an alkyl aryl sulfonate and inorganic sodium salts.

7. A lubricant composition free of petroleum hydrocarbons for use in pulling cables through conduits consisting essentially of a spongy homogeneous blend of a complex of between about 60 and 65 weight percent of glycerine and between about 25 and 30 weight percent of sodium montmorillonite clay in which adsorbed interlayer water has been displaced by glycerine, between about 5 and 10 weight percent of a layered talc mineral of a particle size to pass through a 200 mesh screen having no interlayer water dispersed in said blend, and between about 1.5 and 2.5 weight percent of an anionic detergent comprising a mixture of between about 60 and 65 weight percent of an alkyl aryl sulfonate and between about 25 and 30 weight percent of sodium sulfate, said detergent having clay-deflocculating and foam-forming properties whereby a spongy and adhesive consistency is imparted to the glycerine-clay blend.

8. An adhesive petroleum-free lubricant composition for use in pulling through conduits, said lubricant consisting essentially of a spongy cohesive blend of between 5 and 10 weight percent of a layered mineral filler of a particle size to pass through a 200 mesh screen selected from the group consisting of talc, mica, pyrophyllite and kaolin, all characterized by having a layer lattice and no interlayer water, and a complex of between 60 and 65 weight percent of glycerine and between 25 and 30 weight percent of a sodium bentonite clay, together with between 1.5 and 2.5 weight percent of a foaming and deflocculating agent consisting essentially of an alkyl aryl sulfonate and sodium sulfate.

References Cited in the file of this patent

UNITED STATES PATENTS

| | | |
|---|---|---|
| 1,970,902 | Brunstrum | Aug. 2, 1934 |
| 2,270,101 | Ballard | Jan. 13, 1942 |
| 2,382,860 | Cook | Aug. 14, 1945 |
| 2,514,296 | Small et al. | July 4, 1950 |
| 2,622,987 | Ratcliffe | Dec. 23, 1952 |
| 2,658,004 | Eldridge et al. | Nov. 3, 1953 |

OTHER REFERENCES

Organophilic Bentonites "Swelling in Organic Liquids," by John W. Jordan, Journal of Physical and Colloid Chem., vol. 53, No. 2, February 1949, p. 299.